(12) United States Patent
Smith

(10) Patent No.: US 9,109,742 B2
(45) Date of Patent: Aug. 18, 2015

(54) LOW PROFILE MOUNT FOR FLAT PANEL ELECTRONIC DISPLAY

(75) Inventor: Paul Smith, Apple Valley, MN (US)

(73) Assignee: Milestone AV Technologies LLC, Savage, MN (US)

( * ) Notice: Subject to any disclaimer, the term of this patent is extended or adjusted under 35 U.S.C. 154(b) by 403 days.

(21) Appl. No.: 13/061,910

(22) PCT Filed: Aug. 31, 2009

(86) PCT No.: PCT/US2009/055535
§ 371 (c)(1),
(2), (4) Date: May 23, 2011

(87) PCT Pub. No.: WO2010/027945
PCT Pub. Date: Mar. 11, 2010

(65) Prior Publication Data
US 2011/0234926 A1    Sep. 29, 2011

Related U.S. Application Data

(60) Provisional application No. 61/093,676, filed on Sep. 2, 2008.

(51) Int. Cl.
*H04N 5/64* (2006.01)
*F16M 13/02* (2006.01)
*F16M 11/10* (2006.01)

(52) U.S. Cl.
CPC ............... *F16M 13/02* (2013.01); *F16M 11/10* (2013.01); *F16M 2200/061* (2013.01)

(58) Field of Classification Search
CPC . F16M 11/10; F16M 13/02; F16M 2200/061; F16M 13/022; A47G 1/1613
USPC ............... 348/836; 248/220.22, 274.1, 125.7, 248/284.1, 288.11, 122.1; 361/679.01
See application file for complete search history.

(56) References Cited

U.S. PATENT DOCUMENTS

| | | |
|---|---|---|
| 153,943 A | 8/1874 | Gray |
| 212,618 A | 2/1879 | Miller |

(Continued)

FOREIGN PATENT DOCUMENTS

| | | |
|---|---|---|
| CN | 1734681 | 2/2006 |
| CN | 1832051 A | 9/2006 |

(Continued)

OTHER PUBLICATIONS

European Search Report re Application Ser. No. EP08712990, Dated Nov. 10, 2009, 5 Pgs.

(Continued)

*Primary Examiner* — Richard Torrente
*Assistant Examiner* — Joseph Suh
(74) *Attorney, Agent, or Firm* — Patterson Thuente Pedersen, P.A.

(57) ABSTRACT

A low-profile mount for a flat panel electronic display that is selectively shiftable between a wall-confronting position wherein the back of the flat panel electronic display is disposed parallel and proximate to the wall surface and a tilt position wherein the top of the display is tilted away from the wall surface. The mount is configured so that points spaced apart forwardly from display receiving surfaces of the mount are shifted along a substantially horizontal axis as the mount is shifted between the wall confronting position and the tilt position. Advantageously, the display can be attached to the mount so that the points are horizontally registered with a center of gravity of the display such that the display is self-balancing at any point along the travel between the wall confronting position and the tilt position.

6 Claims, 17 Drawing Sheets

(56) References Cited

U.S. PATENT DOCUMENTS

| | | |
|---|---|---|
| 257,050 A | 4/1882 | Munson |
| 1,282,489 A | 10/1918 | Strodel |
| 1,320,775 A | 11/1919 | Mather |
| 1,358,159 A | 11/1920 | Kern |
| 1,574,227 A | 2/1926 | Andersen |
| 1,628,218 A | 5/1927 | Beauchamp |
| 1,646,379 A | 10/1927 | Whitehead |
| 1,977,153 A | 10/1934 | Spence, Jr. |
| 2,030,889 A | 2/1936 | Negrotto |
| 2,233,882 A | 3/1941 | Bobek |
| 2,466,219 A | 4/1949 | Farrell et al. |
| 2,734,708 A | 2/1956 | Cohn |
| 2,967,035 A | 10/1961 | Simons |
| 3,146,738 A | 9/1964 | Telarico |
| 3,182,946 A | 5/1965 | Dudko |
| 3,188,030 A | 6/1965 | Fischer |
| 3,464,661 A | 9/1969 | Alesi, Jr. |
| 3,574,340 A | 4/1971 | Busche |
| 3,698,329 A | 10/1972 | Diamond et al. |
| D232,917 S | 9/1974 | Vincent |
| 3,856,246 A | 12/1974 | Sinko |
| 4,068,961 A | 1/1978 | Ebner et al. |
| 4,202,520 A | 5/1980 | Loos et al. |
| 4,238,803 A | 12/1980 | Terao et al. |
| D260,336 S | 8/1981 | Springer |
| D266,827 S | 11/1982 | Withrow |
| 4,483,503 A | 11/1984 | Gahan |
| 4,483,803 A | 11/1984 | Rizkalla |
| D279,249 S | 6/1985 | Fausel |
| 4,549,710 A | 10/1985 | Prince et al. |
| 4,554,590 A | 11/1985 | Chelin et al. |
| D282,328 S | 1/1986 | Brescia et al. |
| 4,562,988 A | 1/1986 | Bumgardner |
| 4,621,782 A | 11/1986 | Carlson et al. |
| 4,645,153 A | 2/1987 | Granzow et al. |
| 4,652,890 A | 3/1987 | Crean |
| 4,687,305 A | 8/1987 | Harris, Jr. et al. |
| 4,708,312 A | 11/1987 | Rohr |
| D293,404 S | 12/1987 | Murphy |
| 4,718,317 A | 1/1988 | Hensler |
| 4,718,519 A * | 1/1988 | Barker ............ 254/122 |
| 4,762,378 A | 8/1988 | Kagami |
| 4,768,744 A | 9/1988 | Leeds et al. |
| 4,814,759 A | 3/1989 | Gombrich et al. |
| 4,836,478 A | 6/1989 | Sweere |
| 4,836,486 A | 6/1989 | Vossoughi et al. |
| 4,844,387 A | 7/1989 | Sorgi et al. |
| 4,880,191 A | 11/1989 | Lake, Jr. |
| 4,934,645 A | 6/1990 | Breslow |
| 4,938,005 A | 7/1990 | Focke |
| D311,130 S | 10/1990 | Whitaker |
| 4,989,813 A | 2/1991 | Kim et al. |
| 5,007,608 A | 4/1991 | Carroll, Jr. |
| 5,037,050 A | 8/1991 | Lin et al. |
| 5,040,759 A | 8/1991 | Wainwright |
| 5,102,081 A | 4/1992 | Barchus |
| 5,102,082 A | 4/1992 | Bang |
| 5,139,223 A | 8/1992 | Sedighzadeh |
| 5,165,644 A | 11/1992 | Allen |
| D331,338 S | 12/1992 | Sussman |
| 5,195,900 A | 3/1993 | Kumagai et al. |
| 5,209,446 A | 5/1993 | Kawai |
| 5,277,392 A | 1/1994 | Rossman et al. |
| 5,305,114 A | 4/1994 | Egashira et al. |
| 5,322,255 A | 6/1994 | Garrett |
| 5,348,385 A | 9/1994 | Berg |
| 5,398,901 A | 3/1995 | Brodmann et al. |
| 5,404,182 A | 4/1995 | Nomura |
| D359,643 S | 6/1995 | Langmade |
| D361,062 S | 8/1995 | Lino et al. |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,603,478 A | 2/1997 | Wang |
| 5,632,463 A | 5/1997 | Sung et al. |
| 5,634,622 A | 6/1997 | Pye |
| 5,664,752 A | 9/1997 | Matthiessen et al. |
| 5,687,939 A | 11/1997 | Moscovitch |
| 5,687,944 A | 11/1997 | Shon |
| 5,713,549 A | 2/1998 | Shieh |
| 5,732,922 A | 3/1998 | Jeon |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,793,503 A | 8/1998 | Haines et al. |
| 5,797,568 A | 8/1998 | Gongora et al. |
| D400,085 S | 10/1998 | Haskin |
| 5,823,504 A | 10/1998 | Kuwajima |
| 5,827,441 A | 10/1998 | Solbjorg |
| 5,842,672 A | 12/1998 | Sweere et al. |
| 5,854,735 A | 12/1998 | Cheng |
| D406,476 S | 3/1999 | Boije |
| 5,876,008 A | 3/1999 | Sweere et al. |
| 5,918,841 A | 7/1999 | Sweere et al. |
| 5,918,845 A | 7/1999 | Whitaker |
| 5,923,528 A | 7/1999 | Lee |
| 5,923,852 A | 7/1999 | Lee |
| 5,924,665 A | 7/1999 | Sweere et al. |
| 5,941,493 A | 8/1999 | Cheng |
| 5,947,429 A | 9/1999 | Sweere et al. |
| D415,768 S | 10/1999 | Howell |
| 5,992,802 A | 11/1999 | Campbell |
| 5,992,809 A | 11/1999 | Sweere et al. |
| D417,611 S | 12/1999 | Van de Lande |
| 5,996,961 A * | 12/1999 | Johnson ............ 248/669 |
| 6,000,560 A | 12/1999 | Barkan |
| 6,012,693 A | 1/2000 | Voeller et al. |
| 6,015,120 A | 1/2000 | Sweere et al. |
| 6,019,332 A | 2/2000 | Sweere et al. |
| 6,036,337 A | 3/2000 | Belfer |
| 6,042,068 A | 3/2000 | Tcherny |
| 6,045,103 A | 4/2000 | Costa et al. |
| 6,047,939 A | 4/2000 | Kim |
| 6,048,013 A | 4/2000 | Moilanen et al. |
| 6,061,104 A | 5/2000 | Evanicky et al. |
| 6,068,227 A | 5/2000 | Morgan et al. |
| D426,142 S | 6/2000 | Moore |
| 6,086,034 A | 7/2000 | McAllister et al. |
| 6,102,348 A | 8/2000 | O'Neill |
| 6,113,047 A | 9/2000 | Wung et al. |
| 6,119,997 A | 9/2000 | Van Lieshout |
| 6,125,030 A | 9/2000 | Mola et al. |
| 6,126,128 A | 10/2000 | Costa et al. |
| 6,138,970 A | 10/2000 | Sohrt et al. |
| RE36,978 E | 12/2000 | Moscovitch |
| 6,189,842 B1 | 2/2001 | Bergeron Gull et al. |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,264,152 B1 | 7/2001 | Bloch et al. |
| 6,273,382 B1 | 8/2001 | Pemberton |
| 6,273,383 B1 | 8/2001 | Oddsen, Jr. |
| 6,292,981 B1 | 9/2001 | Ford et al. |
| 6,336,037 B1 | 1/2002 | Sekine et al. |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,171 B1 | 4/2002 | Suzuki et al. |
| 6,378,830 B1 | 4/2002 | Lu |
| 6,394,403 B1 | 5/2002 | Hung |
| 6,402,109 B1 | 6/2002 | Dittmer |
| 6,409,127 B1 | 6/2002 | VanderHeide et al. |
| 6,409,134 B1 | 6/2002 | Oddsen, Jr. |
| D460,078 S | 7/2002 | Li |
| 6,416,027 B1 | 7/2002 | Hart |
| 6,418,010 B1 | 7/2002 | Sawyer |

(56) References Cited

U.S. PATENT DOCUMENTS

| | | |
|---|---|---|
| 6,419,196 B1 | 7/2002 | Sweere et al. |
| 6,450,467 B2 | 9/2002 | Timm |
| 6,453,509 B1 | 9/2002 | Shin |
| 6,454,234 B1 | 9/2002 | Westbrook |
| 6,478,274 B1 | 11/2002 | Oddsen, Jr. |
| 6,478,275 B1 | 11/2002 | Huang |
| 6,484,987 B2 | 11/2002 | Weaver |
| 6,494,429 B2 | 12/2002 | Tajima |
| 6,505,988 B1 | 1/2003 | Oddsen, Jr. |
| 6,510,049 B2 | 1/2003 | Rosen |
| 6,517,040 B1 | 2/2003 | Wen |
| 6,527,466 B1 | 3/2003 | Blier |
| 6,530,546 B1 | 3/2003 | Cyrell |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,325 S | 7/2003 | Theis |
| D477,606 S | 7/2003 | Theis |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,644,609 B1 | 11/2003 | Scott |
| 6,654,235 B2 | 11/2003 | Imsand |
| 6,663,064 B1 | 12/2003 | Minelli et al. |
| D485,161 S | 1/2004 | Hutchinson |
| 6,671,928 B2 | 1/2004 | Huang |
| 6,672,553 B1 | 1/2004 | Lin |
| 6,695,270 B1 | 2/2004 | Smed |
| D488,708 S | 4/2004 | Lam |
| 6,752,363 B2 | 6/2004 | Boele |
| D493,800 S | 8/2004 | Pfister |
| D494,183 S | 8/2004 | Wills |
| D494,596 S | 8/2004 | Pfister |
| D494,978 S | 8/2004 | Pfister |
| D495,713 S | 9/2004 | Pfister |
| D495,714 S | 9/2004 | Pfister |
| D496,367 S | 9/2004 | Pfister |
| D497,537 S | 10/2004 | O'Keene et al. |
| D503,331 S | 3/2005 | Sjoberg |
| 6,874,743 B2 | 4/2005 | Watanabe et al. |
| D505,477 S | 5/2005 | Rager |
| 6,886,701 B2 | 5/2005 | Hong et al. |
| 6,889,404 B2 | 5/2005 | Lu et al. |
| 6,905,101 B1 | 6/2005 | Dittmer |
| D507,477 S | 7/2005 | Pfister |
| D508,171 S | 8/2005 | Choo |
| 6,923,413 B2 | 8/2005 | Dozier |
| D509,083 S | 9/2005 | Sexton |
| 6,966,532 B2 | 11/2005 | Ishizaki et al. |
| D512,903 S | 12/2005 | Gallien |
| D517,085 S | 3/2006 | Deuschle |
| 7,018,961 B2 | 3/2006 | Tazaki |
| 7,028,961 B1 | 4/2006 | Dittmer et al. |
| D520,017 S | 5/2006 | Kuijk |
| D520,794 S | 5/2006 | Grover |
| 7,063,296 B2 | 6/2006 | Williams |
| D530,595 S | 10/2006 | Lam et al. |
| D531,489 S | 11/2006 | Concari et al. |
| D532,290 S | 11/2006 | David |
| D533,483 S | 12/2006 | Simmons et al. |
| 7,152,836 B2 | 12/2006 | Pfister et al. |
| 7,178,774 B2 | 2/2007 | Kim |
| 7,178,775 B2 | 2/2007 | Pfister et al. |
| D537,656 S | 3/2007 | Stenhouse et al. |
| D538,093 S | 3/2007 | Lee |
| D538,140 S | 3/2007 | Hau et al. |
| D538,141 S | 3/2007 | Stenhouse et al. |
| D538,632 S | 3/2007 | Hau et al. |
| D539,125 S | 3/2007 | Hau et al. |
| D539,126 S | 3/2007 | Stenhouse |
| D539,128 S | 3/2007 | Hau et al. |
| D539,636 S | 4/2007 | Bremmon |
| D539,637 S | 4/2007 | Hau et al. |
| D539,639 S | 4/2007 | Nagle |
| D540,154 S | 4/2007 | Bremmon |
| D543,729 S | 6/2007 | Weatherly |
| D545,604 S | 7/2007 | Eyman et al. |
| D546,103 S | 7/2007 | Eyman et al. |
| D547,585 S | 7/2007 | Netto et al. |
| D549,232 S | 8/2007 | Li et al. |
| D549,636 S | 8/2007 | Dial |
| 7,267,314 B1 | 9/2007 | Erickson |
| 7,269,912 B2 | 9/2007 | Muday et al. |
| D553,125 S | 10/2007 | Hau et al. |
| D553,483 S | 10/2007 | Grey |
| 7,300,029 B2 | 11/2007 | Petrick et al. |
| D559,658 S | 1/2008 | Wohlford |
| D560,411 S | 1/2008 | Chung |
| D560,670 S | 1/2008 | Anderson et al. |
| D560,671 S | 1/2008 | Muday et al. |
| D560,672 S | 1/2008 | Muday et al. |
| 7,316,379 B1 | 1/2008 | Graham |
| D561,562 S | 2/2008 | Wohlford |
| D561,775 S | 2/2008 | Wohlford et al. |
| D563,416 S | 3/2008 | Bremmon |
| D563,962 S | 3/2008 | Grey |
| D565,054 S | 3/2008 | Anderson et al. |
| D565,388 S | 4/2008 | Concari |
| D565,399 S | 4/2008 | Grey |
| D570,199 S | 6/2008 | Bremmon |
| D570,355 S | 6/2008 | Muday et al. |
| D570,852 S | 6/2008 | Muday et al. |
| 7,380,760 B2 | 6/2008 | Dittmer |
| 7,387,286 B2 | 6/2008 | Dittmer et al. |
| 7,395,996 B2 | 7/2008 | Dittmer |
| 7,438,269 B2 | 10/2008 | Pfister et al. |
| 7,445,187 B2 | 11/2008 | Shin |
| D581,914 S | 12/2008 | Bures et al. |
| D587,036 S | 2/2009 | Russell |
| D587,504 S | 3/2009 | Russell |
| 7,513,474 B2 | 4/2009 | Anderson et al. |
| 7,537,189 B2 | 5/2009 | Jung et al. |
| D595,277 S | 6/2009 | Bremmon et al. |
| D595,702 S | 7/2009 | Bremmon et al. |
| D610,436 S | 2/2010 | Bremmon et al. |
| D610,437 S | 2/2010 | Bremmon et al. |
| D612,182 S | 3/2010 | Bremmon et al. |
| 7,712,717 B2 | 5/2010 | Burns |
| 7,731,143 B2 | 6/2010 | Muday et al. |
| 7,841,575 B1 * | 11/2010 | Sliger .................. 248/454 |
| 7,866,621 B1 | 1/2011 | Walters |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0084396 A1 | 7/2002 | Weaver |
| 2002/0179791 A1 | 12/2002 | Kwon |
| 2002/0179801 A1 | 12/2002 | Kim |
| 2002/0190180 A1 | 12/2002 | Cotterill |
| 2003/0042385 A1 | 3/2003 | Hung et al. |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |
| 2004/0056161 A1 | 3/2004 | Ishizaki et al. |
| 2004/0079849 A1 | 4/2004 | Rudolf |
| 2004/0211870 A1 | 10/2004 | Bremmon et al. |
| 2004/0232298 A1 | 11/2004 | Bremmon |
| 2004/0232301 A1 | 11/2004 | Bremmon |
| 2004/0245416 A1 | 12/2004 | Attee |
| 2004/0245420 A1 | 12/2004 | Pfister et al. |
| 2005/0051688 A1 | 3/2005 | Dittmer |
| 2005/0087661 A1 | 4/2005 | Rabenius |
| 2005/0110911 A1 * | 5/2005 | Childrey et al. .............. 348/794 |
| 2005/0133678 A1 | 6/2005 | Dittmer |
| 2005/0152102 A1 | 7/2005 | Shin |
| 2005/0194498 A1 | 9/2005 | Burns et al. |

(56) References Cited

U.S. PATENT DOCUMENTS

| | | |
|---|---|---|
| 2005/0236542 A1 | 10/2005 | O'Neill |
| 2005/0236548 A1 | 10/2005 | Maruta |
| 2005/0263659 A1 | 12/2005 | Pfister et al. |
| 2006/0006296 A1* | 1/2006 | Morita .................... 248/200 |
| 2006/0065800 A1 | 3/2006 | Bremmon |
| 2006/0065806 A1 | 3/2006 | Shin |
| 2006/0186294 A1 | 8/2006 | VanGroesen et al. |
| 2006/0231711 A1* | 10/2006 | Shin .................... 248/291.1 |
| 2006/0244870 A1* | 11/2006 | Yamato et al. ............ 348/836 |
| 2006/0291152 A1 | 12/2006 | Bremmon |
| 2007/0007413 A1* | 1/2007 | Jung et al. .............. 248/284.1 |
| 2007/0023599 A1* | 2/2007 | Fedewa ................. 248/284.1 |
| 2007/0041150 A1 | 2/2007 | Short et al. |
| 2007/0090250 A1 | 4/2007 | O'Keene |
| 2007/0103856 A1 | 5/2007 | She |
| 2007/0158515 A1* | 7/2007 | Dittmer et al. .......... 248/283.1 |
| 2007/0176067 A1 | 8/2007 | Monaco |
| 2007/0181762 A1 | 8/2007 | Dittmer |
| 2007/0193481 A1 | 8/2007 | Wiebe et al. |
| 2007/0235614 A1 | 10/2007 | O'Keene et al. |
| 2008/0054147 A1 | 3/2008 | Muday et al. |
| 2008/0068784 A1 | 3/2008 | Bouissiere |
| 2008/0156949 A1 | 7/2008 | Schuller et al. |
| 2008/0156953 A1* | 7/2008 | Oh et al. ................ 248/284.1 |
| 2008/0315049 A1 | 12/2008 | Bailo et al. |
| 2009/0050763 A1 | 2/2009 | Dittmer et al. |
| 2009/0084918 A1 | 4/2009 | Pfister et al. |
| 2009/0159768 A1* | 6/2009 | Oh ....................... 248/284.1 |
| 2010/0149736 A1 | 6/2010 | Dittmer et al. |
| 2011/0216251 A1* | 9/2011 | Perez Perez et al. ........ 348/836 |

FOREIGN PATENT DOCUMENTS

| | | |
|---|---|---|
| DE | 3215379 A1 | 10/1983 |
| DE | 29809300 U1 | 9/1998 |
| DE | 20200148 U1 | 7/2002 |
| EP | 087122990 | 9/2009 |
| GB | 1280913 A | 7/1972 |
| GB | 994246 | 8/1980 |
| JP | 2000-214787 | 8/2000 |
| JP | 3078557 U | 4/2001 |
| JP | 2001-175188 A | 6/2001 |
| JP | 2006-071769 A | 3/2006 |
| KR | 2000 0012455 | 7/2000 |
| KR | 10-2003-0094458 | 12/2003 |
| KR | 10-2004-0021741 | 3/2004 |
| KR | 10-2004-0037618 | 5/2004 |
| KR | 10-2005-0058738 | 6/2005 |
| KR | 10-2006-0034351 A | 4/2006 |
| KR | 20-2000-0012455 U | 10/2006 |
| KR | 10-2007-0096626 A | 10/2007 |
| KR | 10-2007-0120689 A | 12/2007 |
| WO | WO00/73697 A1 | 12/2000 |
| WO | WO02/42681 A1 | 5/2002 |
| WO | WO03/050786 A1 | 6/2003 |
| WO | WO2004/070257 A1 | 8/2004 |
| WO | WO2006/044969 A1 | 4/2006 |
| WO | WO2006/127826 A2 | 11/2006 |
| WO | WO2006/133188 A2 | 12/2006 |
| WO | WO2007/044289 A2 | 4/2007 |
| WO | WO2008/053242 A1 | 5/2008 |
| WO | WO2008/085889 A1 | 7/2008 |
| WO | WO2010/080925 A1 | 7/2010 |

OTHER PUBLICATIONS

PCT Search Report and Written Opinion for International Application No. PCT/US2008/000117, Mailed Jun. 11, 2008, 12 Pgs.
Office Action cited in Chinese Patent Application No. 200880000229.8, Dated Jul. 22, 2011.
Examiner's First Report Cited in Australian Application No. 2008205387, Dated Apr. 14, 2011, 4 Pgs.
International Search Report for PCT/US2009/030147, Mailed Mar. 23, 2009, 1 Pg.
*Sanus VisionMount* Catalog, copyright Mar. 2007, 40 Pgs.
Chief Manufacturing, Inc., *Full-Line Product Guide 2004*, Jan. 2004, 64 Pgs.
Chief Manufacturing, Inc., *The Focus: Presentation Support Solutions*, Jan. 2003, 80 Pgs.
Chief Manufacturing, Inc., *The Focus: Presentation Support Solutions*, Full-Line Product Guide, Apr. 2002, 66 Pgs.
Mounts by PDR, A Division of David Engineering, *Panel Display Pivot Mount*, 4 Pgs.
Fimco, *Wall Mount Kit for Plasma TV Screens*, Nov. 2003, 12 Pgs.
Peerless, *SmartMount™ Universal Tilt Wall Mount for 32" to 50" Plasma and LCD Flat Panel Screens*, 2006, 2 Pgs.
Peerless, *SmartMount™ Universal Tilt Wall Mount for 61" to 102" Plasma and LCD Flat Panel Screens*, 2006, 2 Pgs.
Peerless, *SmartMount™ Universal Tilt Wall Mount for 42" to 71" Plasma and LCD Flat Panel Screens*, 2006, 2 Pgs.
Peerless, *SmartMount™ Universal Tilt Wall Mount for 32" to 60" Plasma and LCD Flat Panel Screens*, 2006, 2 Pgs.
Peerless, *SmartMount™ Universal Tilt Wall Mount for 23" to 46" LCD Flat Panel Screens*, 2006, 2 Pgs.
Peerless, *SmartMount™ Universal Flat Wall Mount for 61" to 102" Plasma and LCD Flat Panel Screens*, 2006, 2 Pgs.
Peerless, *SmartMount™ Universal Flat Wall Mount for 42" to 71" Plasma and LCD Flat Panel Screens*, 2006, 2 Pgs.
Peerless, *SmartMount™ Universal Flat Wall Mount for 32" to 60" Plasma and LCD Flat Panel Screens*, 2006, 2 Pgs.
Peerless, *SmartMount™ Universal Flat Wall Mount for 23" to 46" LCD Flat Panel Screens*, 2006, 2 Pgs.
Peerless, *SmartMount™ Universal Tilt Wall Mount for 22" to 49" Screens*, Mar. 31, 2005, 12 Pgs.
ViewSonic Mount, 2005, 1 Pg.
Hitachi Mount, 2005, 1 Pg.
Instruction Manual for Superior Mount, dated Feb. 1, 2007, 12 Pgs.
Chief Manufacturing, Inc., Full Line Catalog, *Mounting Solutions Product Guide*, Copyright Jun. 2006, 122 Pgs.
EP Communication/Supplementary Search Report re Application No. EP09812096, Dated Oct. 28, 2011, 6 Pgs.
EP Communication/Supplementary Search Report re Application No. EP09700554, Dated Nov. 2, 2011, 6 Pgs.
Chinese Office Action Dated Jul. 23, 2013, Related to Chinese Application No. 200980136448.3, 12 Pgs.
Chinese Office Action for Chinese Application No. 200980136448.3, dated Apr. 15, 2014. English translated provided.
EP Examination Report for EP Application No. 09 812 096.7, dated Sep. 9, 2014. English version.

* cited by examiner

LOW PROFILE MOUNT FOR FLAT PANEL ELECTRONIC DISPLAY

RELATED APPLICATIONS

The application claims the benefit of U.S. Provisional Application No. 61/093,676, entitled LOW PROFILE MOUNT FOR FLAT-PANEL ELECTRONIC DISPLAY, filed Sep. 2, 2008, said application being hereby fully incorporated herein by reference.

FIELD OF THE INVENTION

The present invention relates to electronic displays and more specifically to mounts for electronic displays.

BACKGROUND OF THE INVENTION

An attribute of modern flat-panel electronic displays that makes them highly desirable to consumers is the aesthetic appeal of a very flat device that has the appearance of a framed photo or painting when hung from a wall. This same attribute is also desirable in that floor and interior space taken up under the display is minimal.

Mounting devices have been developed for flat-panel electronic displays that enable the display to be mounted very close to the wall. These prior mounting devices, however, have drawbacks.

One drawback of prior low-profile mounting devices is that they generally do not enable access to the rear of the display for the connection of cables and wires once the display is in place on the mount. Instead, the installer must wrestle with a sometimes heavy and awkward display device to connect the wires before mounting on the wall. Further, the wires may then interfere with attachment to the wall once connected.

Another drawback to prior low-profile display mounts is that they often do not provide secure attachment to the wall so as to prevent inadvertent detachment of the display. In one such prior mount, a simple hook arrangement is used at the top of the device, with a strip of hook- and loop material below to hold the device in place. If the bottom of the display is pulled away from the wall slightly, the hook-and-loop material disengages and enables disengagement of the top hook, leading to the display falling onto the floor.

A further drawback of many prior low-profile display mounting devices is that they are awkward and difficult to manipulate. An installer attempting to mount the display device may have to lift a heavy or large size display into an awkward position in order to attach the device to a wall mount, or may have to manipulate complicated catches or latching devices while simultaneously lifting.

Another drawback of previous low profile mounts is that they represent a compromise between closeness of the display to the wall surface and the range of tilting motion available for the display. If the mount has a very low profile, the tilt range of the mount is limited because the edge of the display contacts the wall when tilting. If the mount is made thicker to accommodate the tilt motion of the display, the desirable aesthetic of a display mounted close to the wall surface is lost.

Accordingly, what is still needed in the industry is a low-profile electronic display mounting device that overcomes these drawbacks.

SUMMARY OF THE INVENTION

Embodiments of the present invention provide a low-profile display mount that overcomes the drawbacks of the prior art. According to embodiments of the invention, a display mount includes a wall interface plate, and one or more tilt assemblies. Each tilt assembly presents a display receiving surface for receiving the back side of the display thereon. The tilt assemblies are shiftable between a wall confronting position wherein the back side of the display is proximate and substantially parallel with the wall surface, and a tilt position wherein the top of the display is tilted away from the wall. The tilt assemblies are configured so that points spaced apart forwardly of the display receiving surfaces translate along a substantially horizontal axis as the tilt assemblies are shifted between the wall confronting position and the tilt position. Advantageously, the display can be attached to the mount so that the points are horizontally registered with a center of gravity of the display such that the display is self-balancing at any point along the travel between the wall confronting position and the tilt position. The mount may enable the back side of the display to be spaced apart between only about 0.25 to 0.50 inch, and preferably 0.30 inch, from the wall when in the wall confronting position, while still enabling tilt positioning of the display.

According to an embodiment, an electronic display system includes a flat panel electronic display and a mount for attaching the flat panel electronic display to a substantially vertical wall surface. The mount includes a wall interface adapted to attach to the wall surface and a pair of tilt assemblies. Each tilt assembly includes a hook bracket for engaging the wall interface, a display interface presenting a display receiving surface for receiving the flat panel electronic display, and a scissors assembly operably coupling the hook bracket and the display interface. The tilt assemblies are coupled to a rear side of the flat panel electronic display and are selectively shiftable between a wall confronting position wherein the rear side of the flat panel electronic display is substantially parallel and proximate to the wall, and a tilt position wherein the top of the flat panel electronic display is tilted away from the wall. The scissors assembly is configured so that a point forward of the display receiving surface and horizontally registered with a center of gravity of the flat panel electronic display translates substantially horizontally as the tilt assembly is shifted between the wall confronting position and the tilt position. In some embodiments, the scissors assembly includes a first arm assembly and a second arm assembly presenting a pair of opposing ends. The first arm assembly is pivotally coupled with the second arm assembly intermediate the opposing ends of the second arm assembly. The first arm assembly may include a pair of parallel rails and the second arm assembly may also include a pair of parallel rails. The first arm assembly may be pivotally coupled to the wall interface and slidably coupled to the display interface, and the second arm assembly may be pivotally coupled to the display interface and slidably coupled to the wall interface. In some embodiments, the pivotal coupling of the first arm assembly to the wall interface is disposed above the slidable coupling of the second arm assembly to the wall interface. Each tilt assembly may further include a kickstand assembly. If so equipped, the flat panel electronic display may be selectively shiftable to a third position enabling access to the back side of the flat panel electronic display wherein the top of the flat panel electronic display is proximate the wall surface and the bottom of the flat panel electronic display is spaced apart from the wall surface, the kickstand assembly including a kickstand for contacting the wall surface to maintain the flat panel electronic display in the third position.

In an embodiment, a mount for attaching a flat panel electronic display to a substantially vertical wall surface includes a wall interface adapted to attach to the wall surface and a pair of tilt assemblies. Each tilt assembly includes a hook bracket for engaging the wall interface, a display interface presenting a display mounting surface adapted to receive the flat panel electronic display thereon, and a scissors assembly operably coupling the hook bracket and the display interface. The tilt assemblies are selectively shiftable between a wall confronting position wherein the rear side of the flat panel electronic display is substantially parallel and proximate to the wall, and a tilt position wherein the top of the flat panel electronic display is tilted away from the wall. The scissors assembly may be configured so that a point spaced apart forwardly from the display receiving surface translates substantially horizontally as the tilt assembly is shifted between the wall confronting position and the tilt position.

In embodiments, the scissors assembly may include a first arm assembly and a second arm assembly presenting a pair of opposing ends, wherein the first arm assembly is pivotally coupled with the second arm assembly intermediate the opposing ends of the second arm assembly. The first arm assembly may include a pair of parallel rails and the second arm assembly may also include a pair of parallel rails. The first arm assembly is pivotally coupled to the wall interface and slidably coupled to the display interface, and the second arm assembly is pivotally coupled to the display interface and slidably coupled to the wall interface. In embodiments, the pivotal coupling of the first arm assembly to the wall interface is disposed above the slidable coupling of the second arm assembly to the wall interface.

In an embodiment, an electronic display system includes a flat panel electronic display and a mount for attaching the flat panel electronic display to a substantially vertical wall surface. The mount includes a wall interface adapted to attach to the wall surface and a pair of tilt assemblies. Each tilt assembly includes means for engaging the wall interface, means for receiving the flat panel electronic display presenting a display receiving surface, and means for operably coupling the means for engaging the wall interface and the means for receiving the flat panel electronic display. The tilt assemblies are coupled to a rear side of the flat panel electronic display and are selectively shiftable between a wall confronting position wherein the rear side of the flat panel electronic display is substantially parallel and proximate to the wall, and a tilt position wherein the top of the flat panel electronic display is tilted away from the wall. The means for operably coupling the means for engaging the wall interface and the means for receiving the flat panel electronic display are configured so that a point forward of the display receiving surface and horizontally registered with a center of gravity of the flat panel electronic display translates substantially horizontally as the tilt assembly is shifted between the wall confronting position and the tilt position.

In embodiments, the means for operably coupling the means for engaging the wall interface and the means for receiving the flat panel electronic display includes a scissors assembly. The scissors assembly may include a first arm assembly and a second arm assembly presenting a pair of opposing ends. The first arm assembly is pivotally coupled with the second arm assembly intermediate the opposing ends of the second arm assembly.

In embodiments, the means for engaging the wall interface may include a hook bracket, and the means for receiving the flat panel electronic display may include a display interface. The first arm is assembly pivotally coupled to the wall interface and slidably coupled to the display interface, and the second arm assembly is pivotally coupled to the display interface and slidably coupled to the wall interface. The pivotal coupling of the first arm assembly to the wall interface may be disposed above the slidable coupling of the second arm assembly to the wall interface.

In embodiments, each tilt assembly may further include a kickstand assembly. The flat panel electronic display may be selectively shiftable to a third position enabling access to the back side of the flat panel electronic display wherein the top of the flat panel electronic display is proximate the wall surface and the bottom of the flat panel electronic display is spaced apart from the wall surface. The kickstand assembly includes a kickstand for contacting the wall surface to maintain the flat panel electronic display in the third position.

BRIEF DESCRIPTION OF THE DRAWINGS

The embodiments of the present invention may be more completely understood in consideration of the following detailed description of various embodiments in connection with the accompanying drawings, in which:

FIG. 11 is another fragmentary exploded view of the display interface of FIG. 9;

Figure 1:
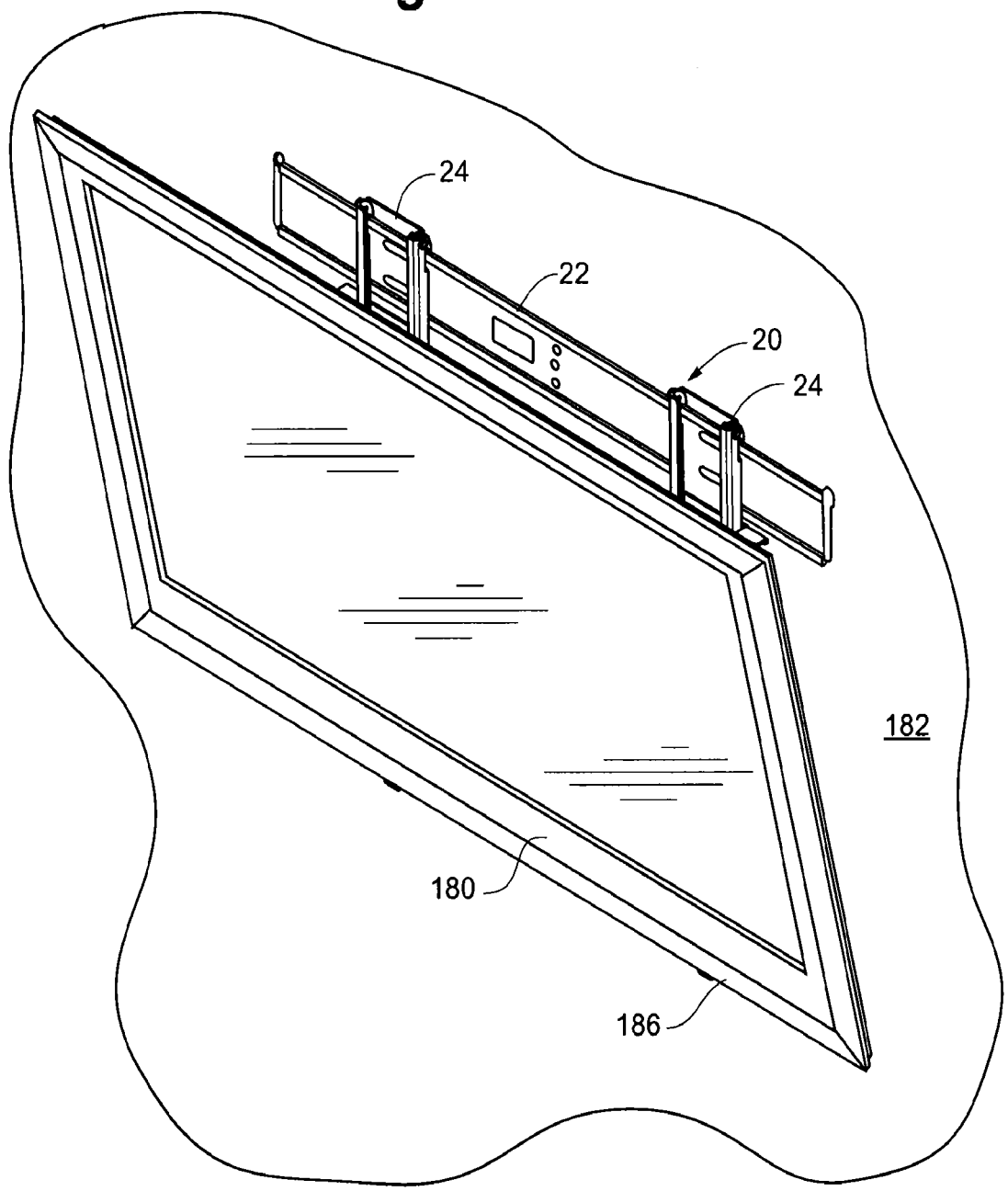
FIG. 1 is a perspective view of a flat panel electronic display mounted on a wall with a display mount according to an embodiment of the invention.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE PREFERRED EMBODIMENTS

In an embodiment depicted in FIGS. 1-14, display mount 20 generally includes wall interface plate 22 and tilt assemblies 24. Wall interface plate 22 generally includes planar portion 26 having projecting upper horizontal lip 28 and projecting lower horizontal lip 30. As depicted in the cross-sectional view of FIG. 15, upper lip 28 includes generally horizontal portion 32 extending outwardly from planar portion 26 and vertical portion 34 extending from horizontal portion 32. Lower lip 30 includes generally horizontal portion 36 extending outwardly from planar portion 26 and vertical portion 38 extending from horizontal portion 36.

Figure 3:
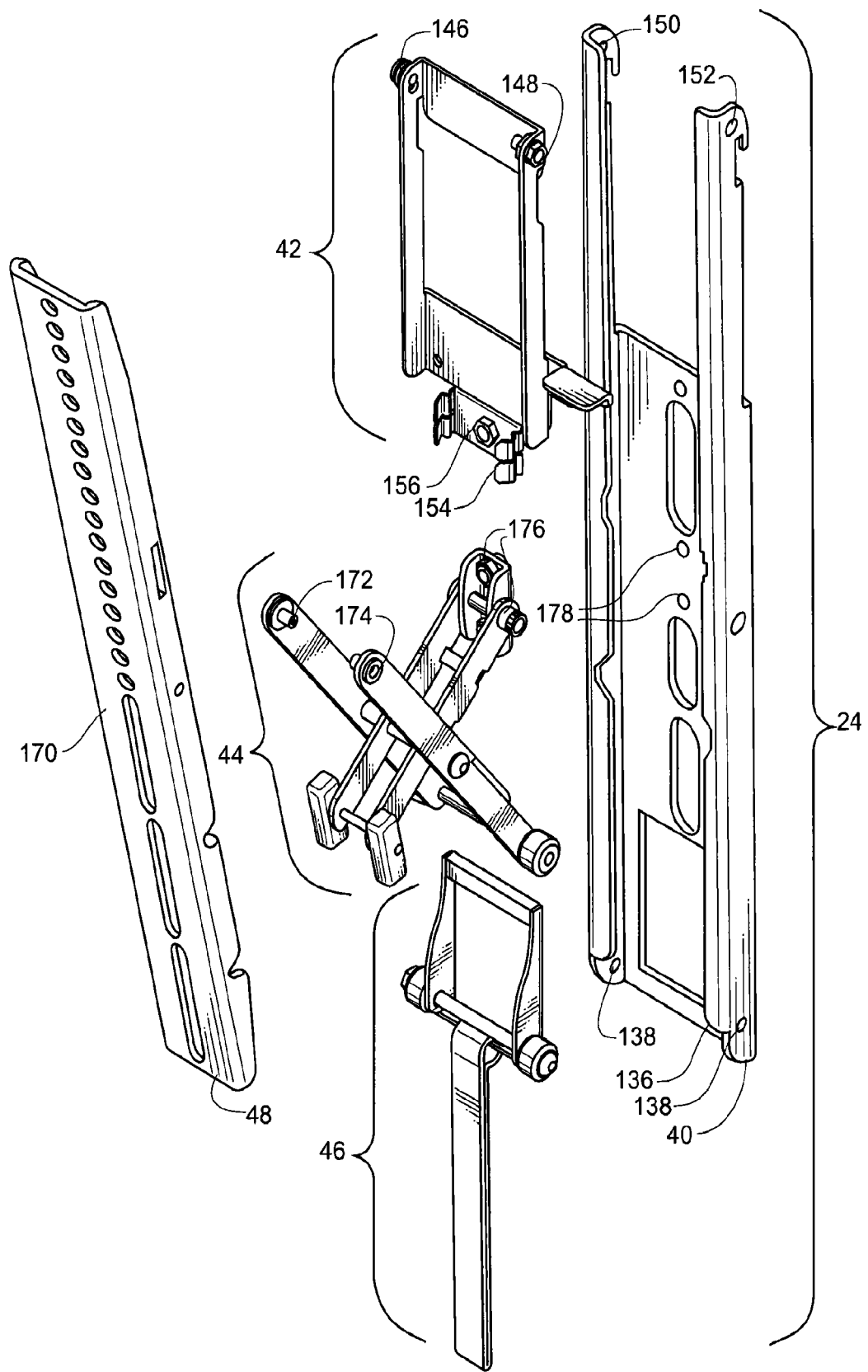
FIG. 3 is a partially exploded perspective view of the tilt-assembly portion of the mount of FIG. 1.
Figure 4:
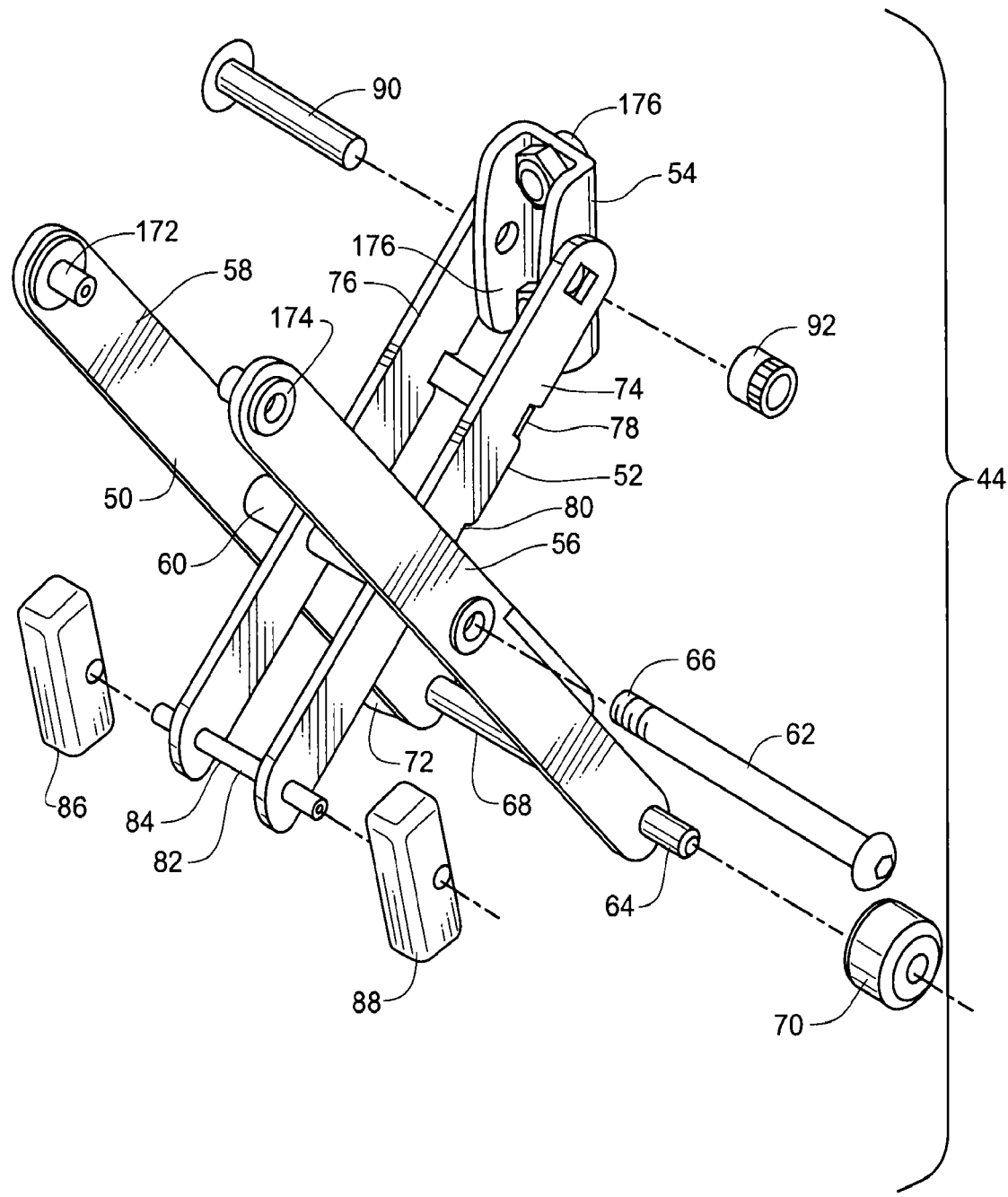
FIG. 4 is a partially exploded view of the scissors assembly portion of the tilt-assembly of FIG. 3.

Each tilt assembly 24, depicted in exploded view in FIG. 3, generally includes hook bracket 40, latch assembly 42, scissors assembly 44, kickstand assembly 46, and display interface 48. As depicted in FIG. 4, scissors assembly 44 generally includes outer arm assembly 50, inner arm assembly 52, and pivot block 54. Outer arm assembly 50 generally includes rails 56, 58, bushing 60, central pivot axle 62, and lower axle assembly 64. Pivot axle 62 extends through apertures in rails 56, 58, and hollow bushing 60, and is secured in place with a nut (not depicted) threaded on distal end 66. Lower axle assembly 64 generally includes axle 68, which extends through apertures in rails 56, 58, and has rollers 70, 72, retained on each end. Inner arm assembly 52 generally includes rails 74, 76, which are coupled by braces 78, 80, and axle assembly 82. Bushing 60 extends through apertures in rails 74, 76. Axle assembly 82 generally includes axle 84 with slide blocks 86, 88, at each end. Inner arm assembly 52 is pivotally coupled to pivot block 54 with upper pivot axle 90. Upper pivot axle 90 is retained in position with nut 92.

Figure 16:
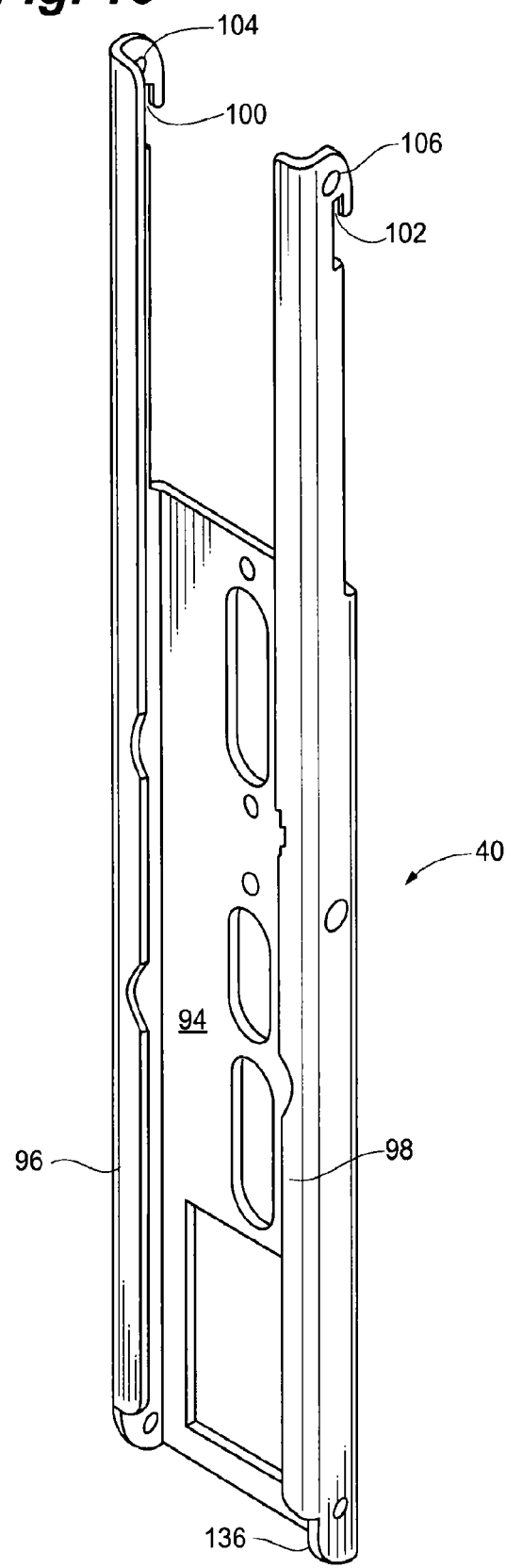
FIG. 16 is a front perspective view of the hook bracket portion of the tilt assembly of FIG. 3.

As depicted in FIG. 16, hook bracket 40 generally includes planar central portion 94 with inwardly projecting flanges 96, 98, at each lateral margin. Hooks 100, 102, are defined at the upper ends 104, 106, of each flange 96, 98, respectively.

Figure 5:
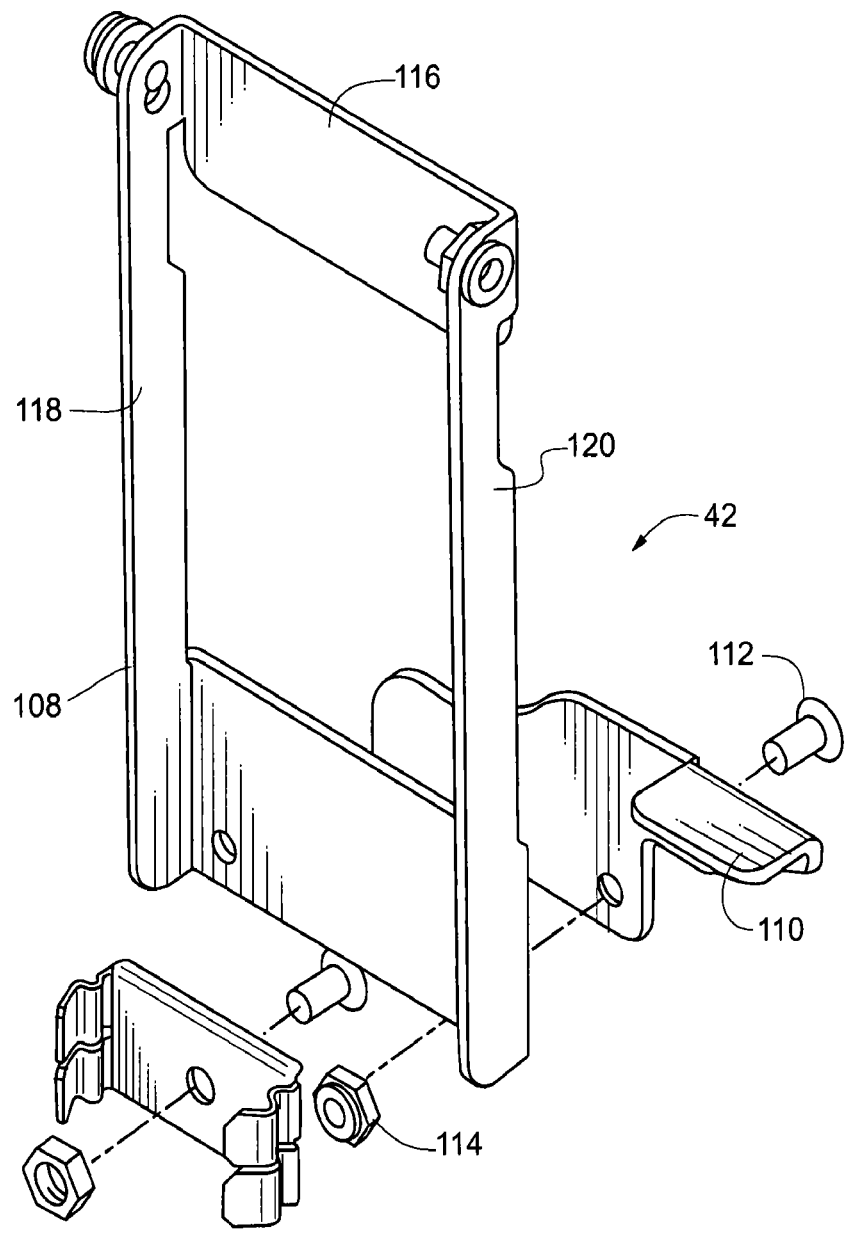
FIG. 5 is a partially exploded view of the latch assembly portion of the tilt-assembly of FIG. 3.
Figure 6:
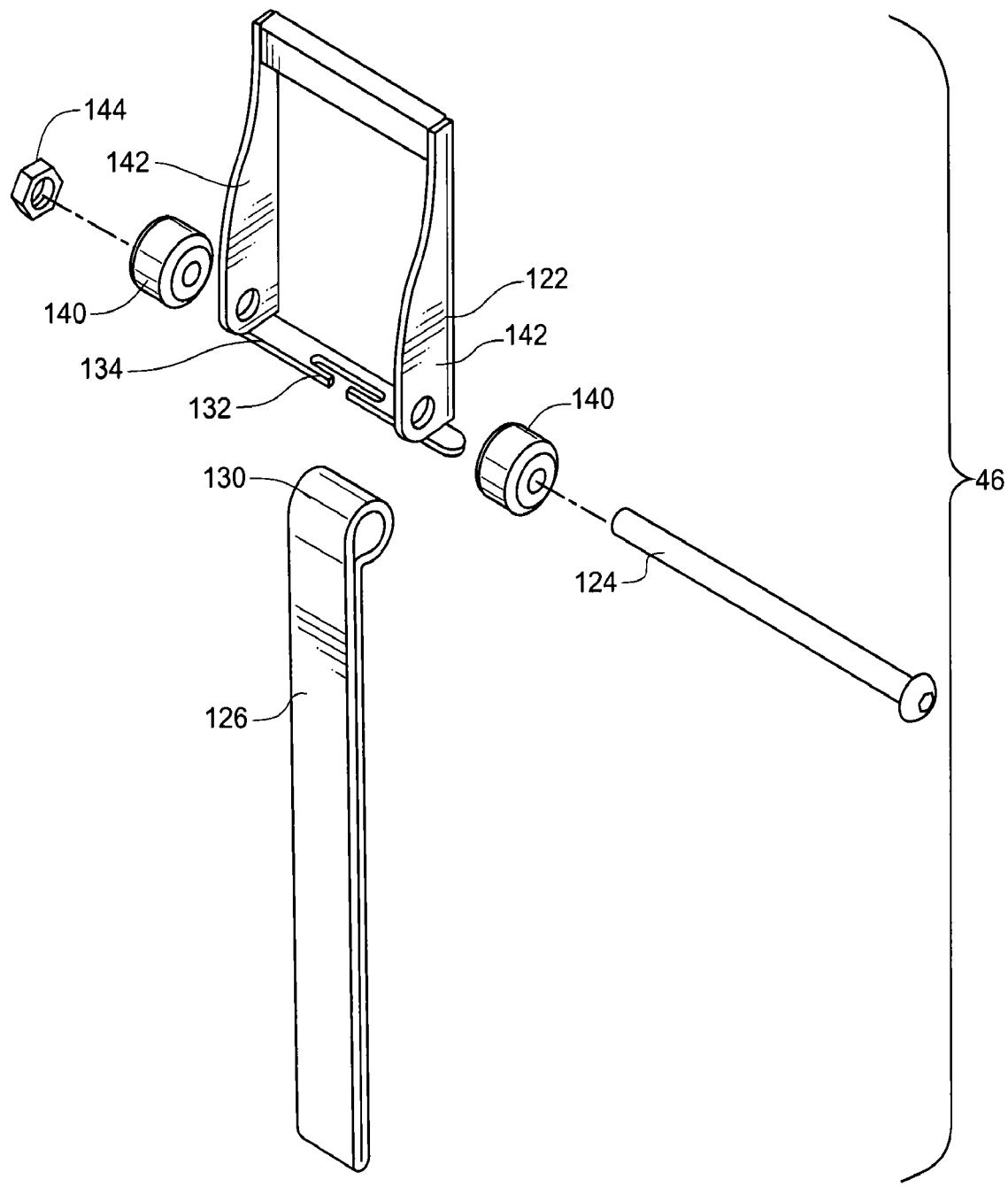
FIG. 6 is a partially exploded view of the kickstand assembly portion of the tilt-assembly of FIG. 3.
Figure 7:
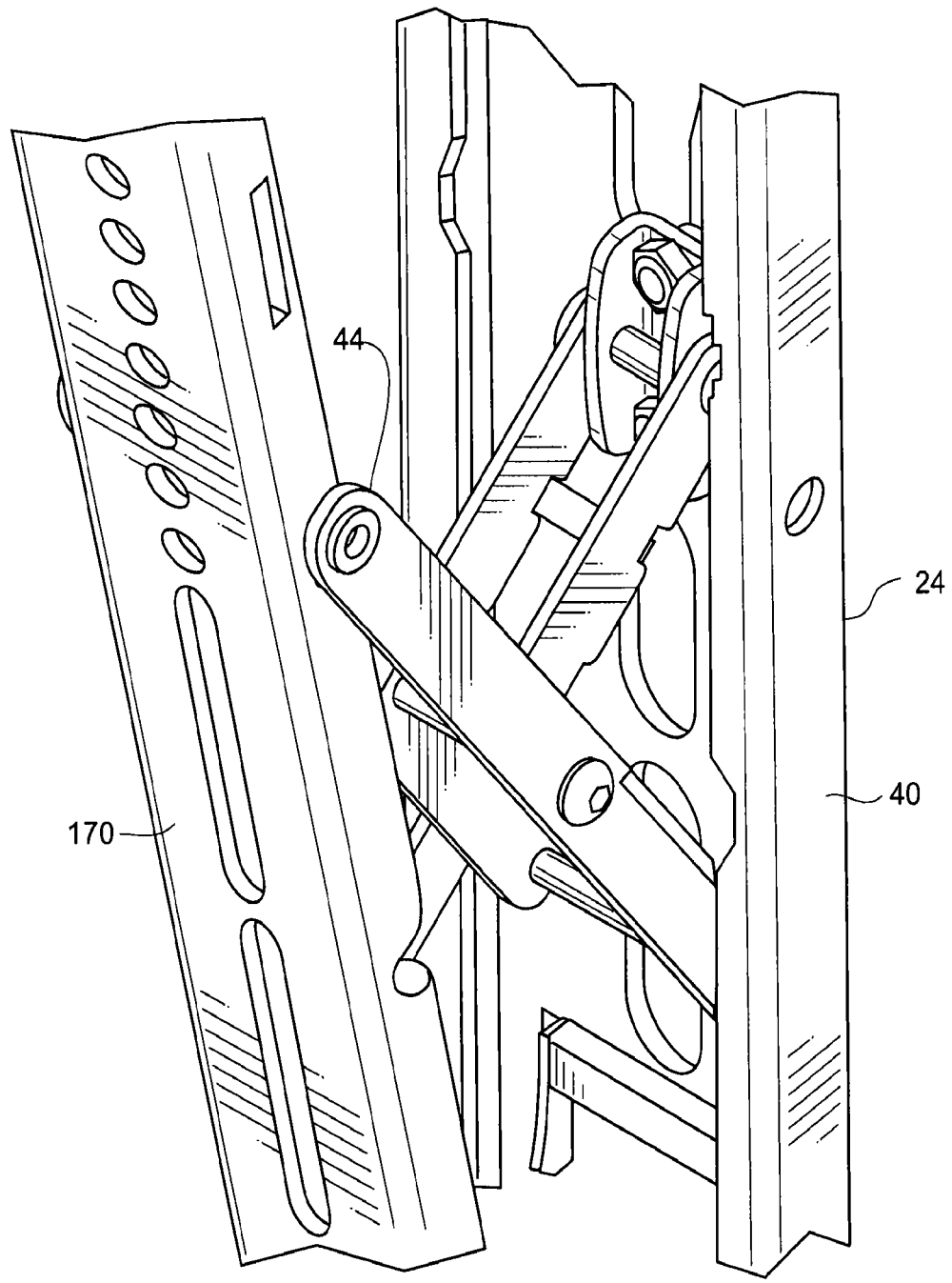
FIG. 7 is a fragmentary perspective view of the scissors assembly portion of the tilt-assembly of FIG. 3.
Figure 8:
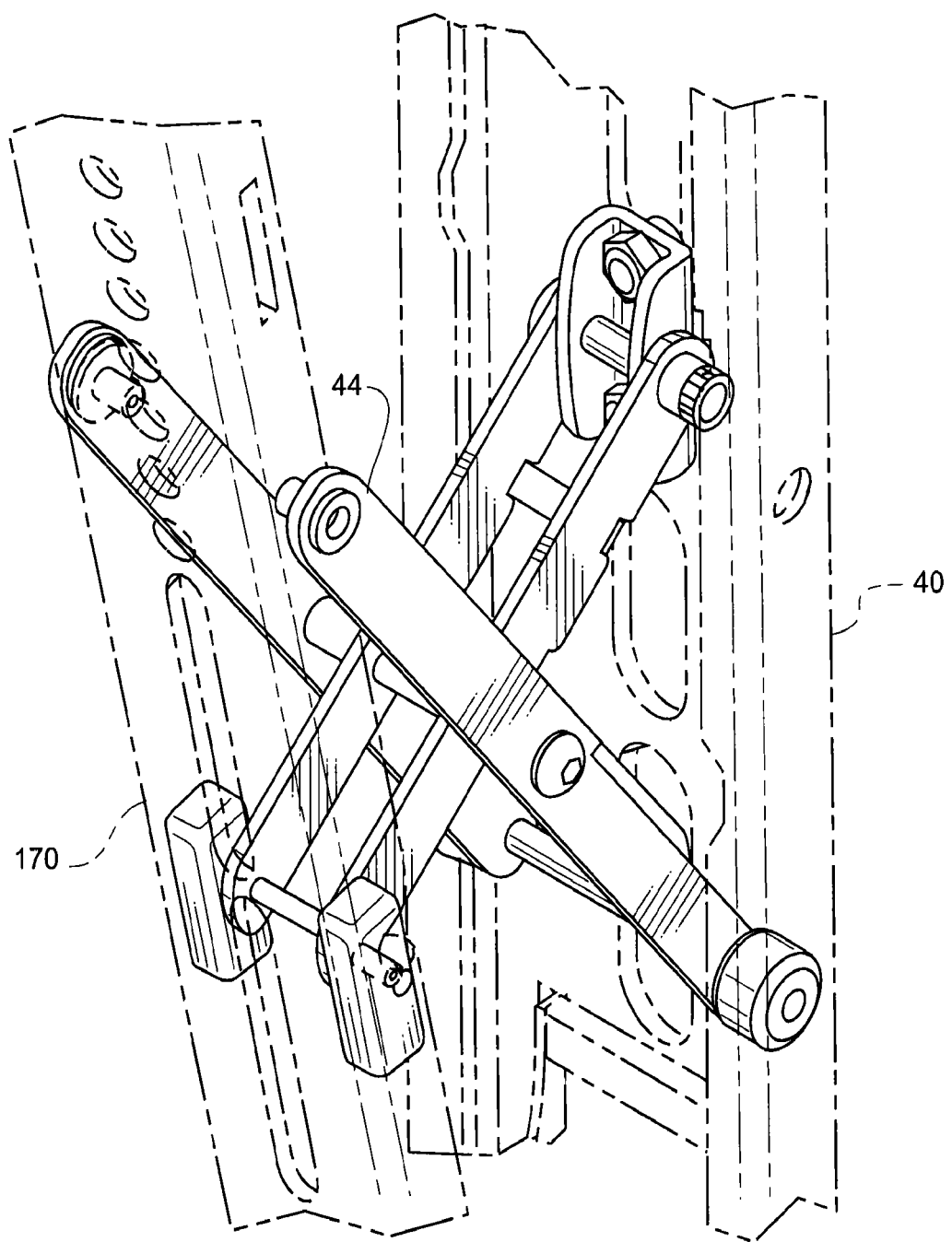
FIG. 8 is a fragmentary perspective view of the scissors assembly portion of the tilt-assembly of FIG. 3 with the display interface and hook bracket portions depicted in phantom.
Figure 9:
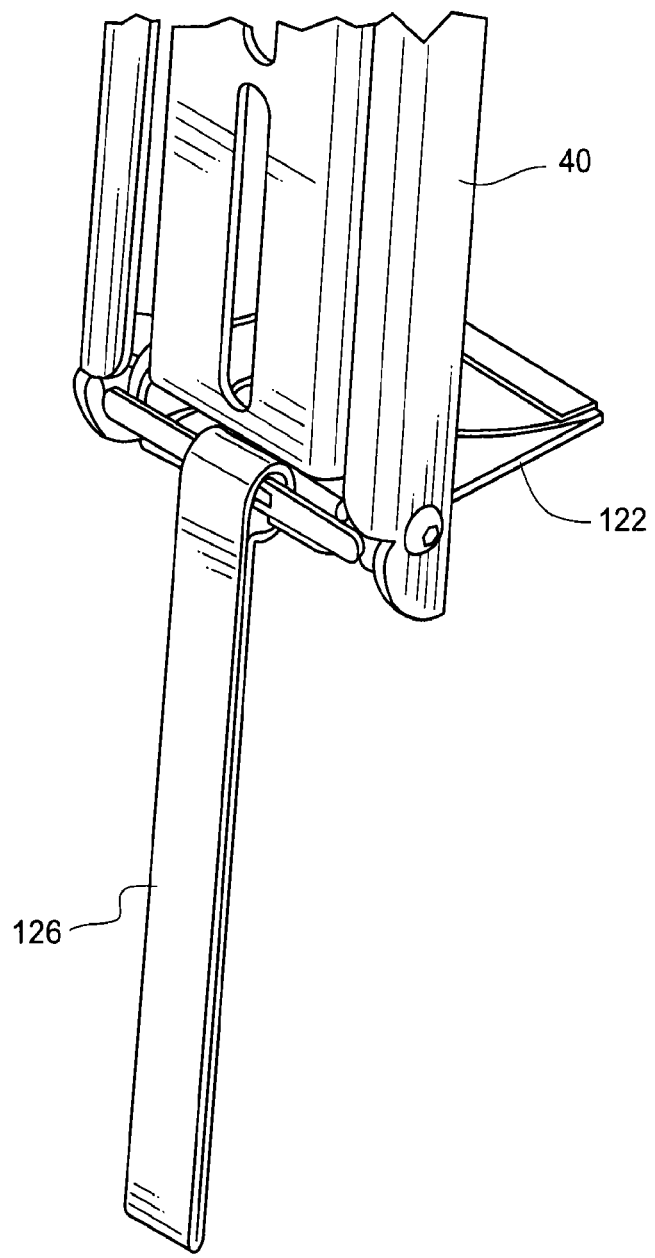
FIG. 9 is a perspective view of the kickstand portion of the tilt-assembly of FIG. 3 with the kickstand extended.

Latch assembly 42, as depicted in FIG. 5, generally includes body 108 and latch 110. Latch 110 is pivotally attached to body 108 with pivot fastener 112 and nut 114. Hook plate 116 extends between rails 118, 120, of body 108 at the upper end thereof.

Figure 2:
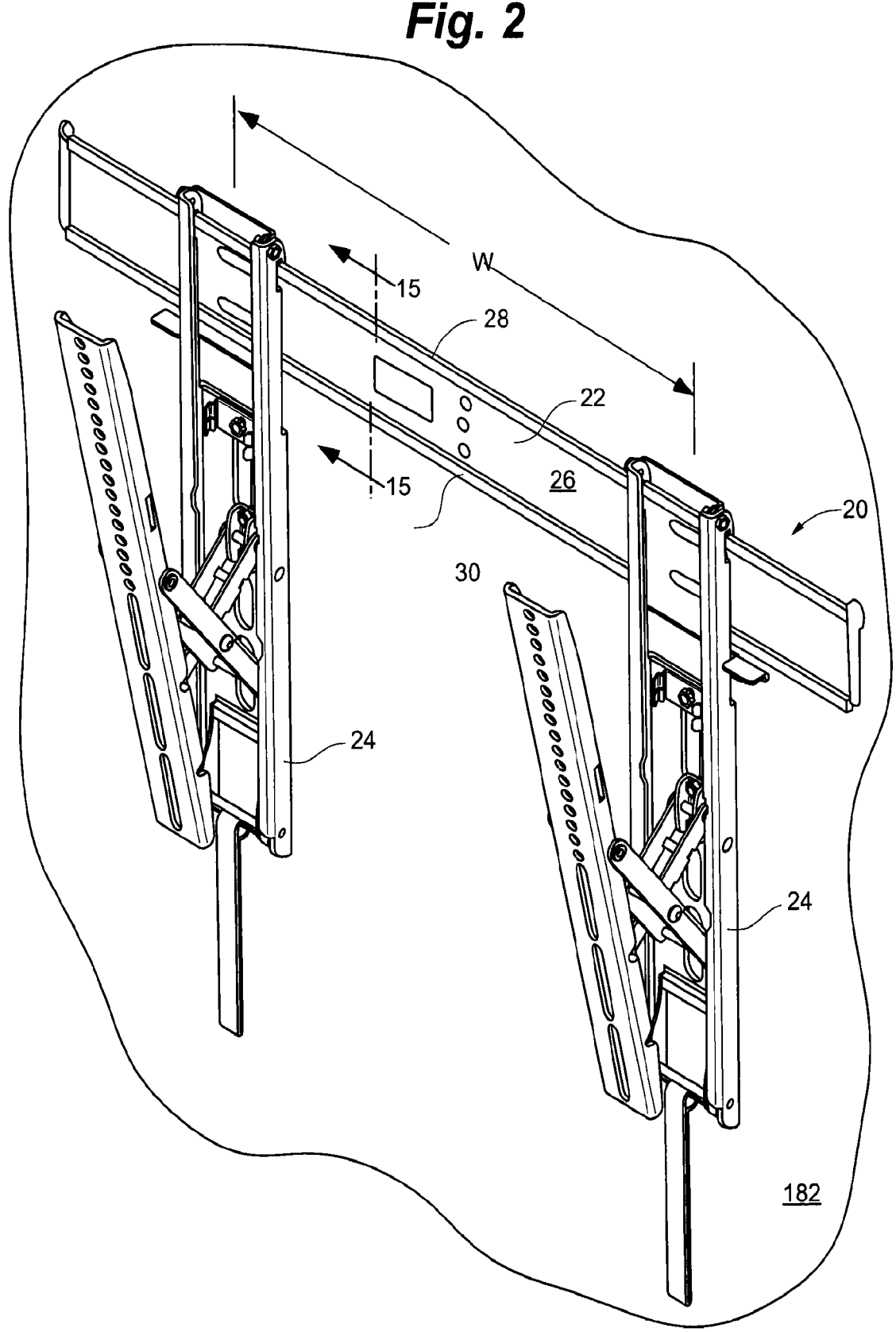
FIG. 2 is a perspective view of the mount of FIG. 1.

Kickstand assembly 46 generally includes kickstand 122, axle 124, and pull handle 126. Loop 130 of pull handle 126 is received in notch 132 in inner end 134 of kickstand 122. As depicted in FIGS. 2 and 3, kickstand 122 is pivotally coupled at bottom end 136 of hook bracket 40, with axle 124 extending through apertures 138. Spacers 140 are disposed between lateral walls 142 of kickstand 122 and hook bracket 40. Axle 124 is retained with nut 144.

As depicted in FIGS. 2 and 3, latch assembly 42 is attached to hook bracket 40 with fasteners 146, 148, extending through apertures 150, 152. Display interface catch 154 is attached to hook bracket 40 just below latch assembly 42 with fastener 156.

Figure 17:
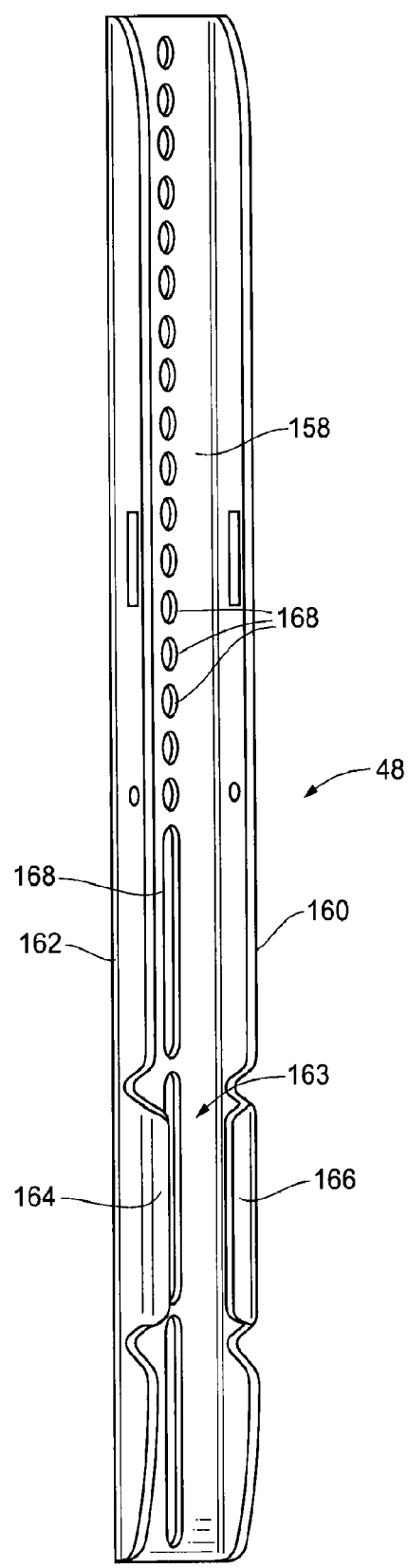
FIG. 17 is a rear perspective view of the display interface portion of the tilt assembly of FIG. 3.

Display interface 48, as depicted in FIG. 17, generally includes planar central portion 158 with rearwardly projecting flanges 160, 162, at each lateral margin. Track portion 163 is defined intermediate the ends of display interface 48 by flanges 164, 166, extending inwardly from flanges 160, 162, respectively. Central portion 158 defines a plurality of apertures 168 for receiving fasteners to attach a flat panel display to display receiving surface 170.

Display interface 48 is coupled to hook bracket 40 with scissors assembly 44. Outer arm assembly is pivotally attached to display interface 48 with fasteners 172, 174, extending through apertures in display interface 48. Pivot block 54 is attached to hook bracket 40 with fasteners 176 through apertures 178. Rollers 70, 72, are rollably received behind inwardly extending flanges 96, 98, of hook bracket 40, while slide blocks 86, 88, are slidably received in track portion 163 of display interface 48 behind flanges 164, 166.

In use, each of tilt assemblies 24 is attached to a rear side of flat panel display 180, with fasteners (not depicted) through apertures 168. It will be appreciated that the plurality of apertures 168 enables tilt assemblies 24 to be attached at any desired vertical position on display 180. Further, tilt assemblies 180 may be spaced apart any distance W as desired, limited only by the location of fastener receiving locations on display 180.

Figure 10:
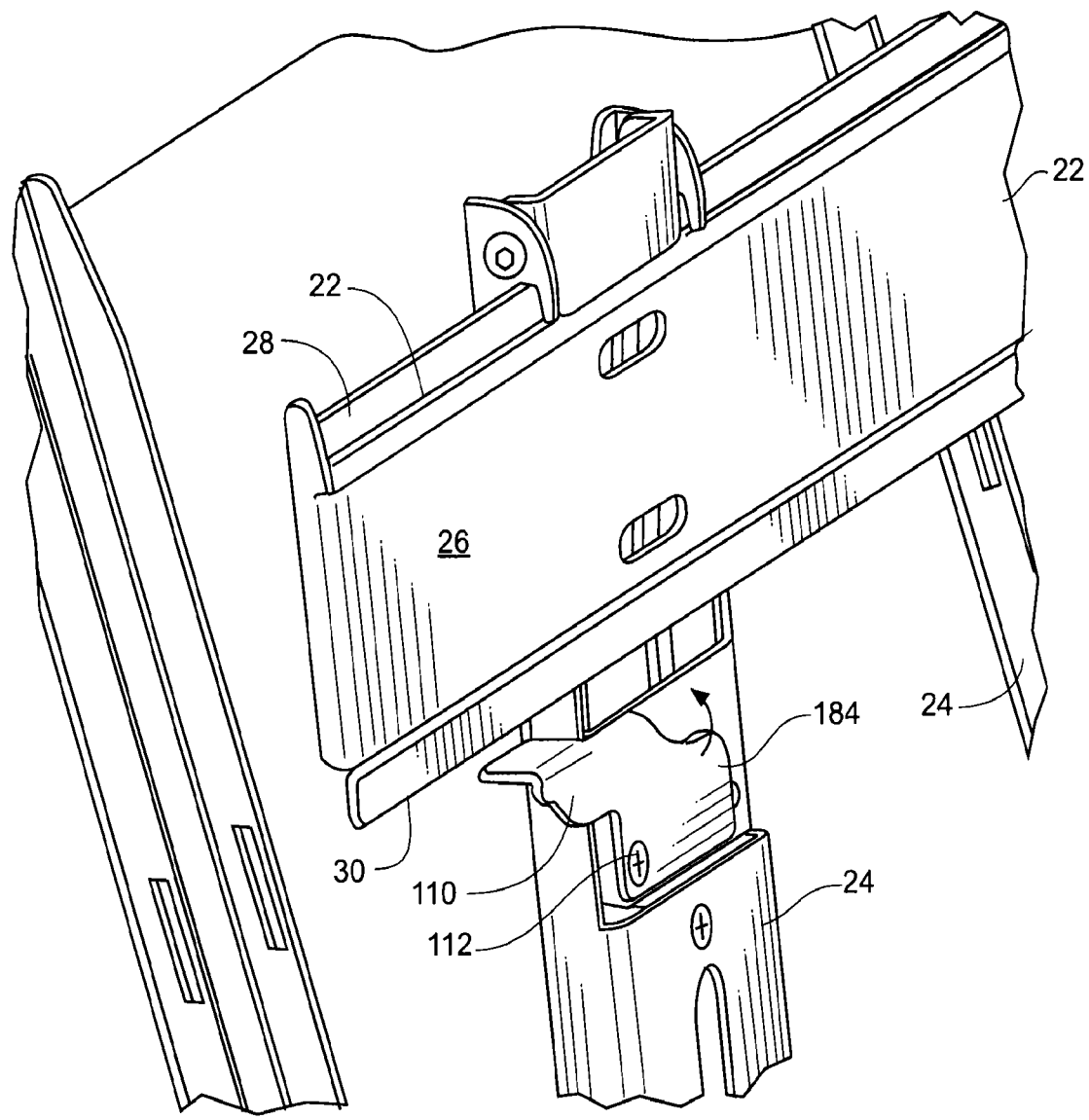
FIG. 10 is a partial perspective view from the rear of the mount of FIG. 2, depicting engagement of the tilt-assembly with the wall interface.
Figure 11:
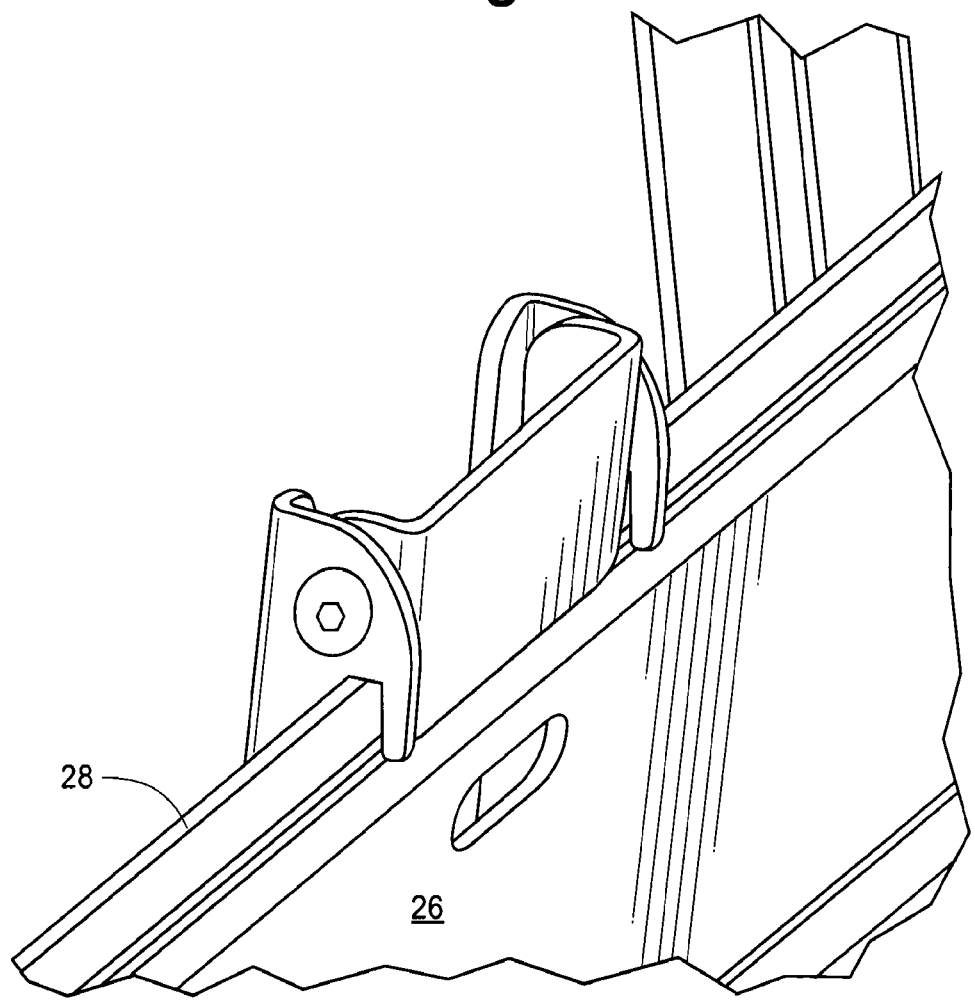
FIG. 11 is a close-up view from the rear of engagement of the tilt-assembly with the wall interface.

Wall interface plate 22 is attached to a wall 182 in a generally horizontal orientation as depicted in FIGS. 1 and 2. Hooks 100, 102, of hook brackets 40 are hooked over upper lip 28, with hook plate 116 also extending behind upper lip 28, as depicted in FIGS. 10 and 11. Latches 110 can then be pivoted about pivot fasteners 112 in the direction of the arrow as depicted in FIG. 10, so that latch ends 184 extend behind lower lip 30, thereby securely latching tilt assemblies 24 to wall interface plate 22.

Figure 14:
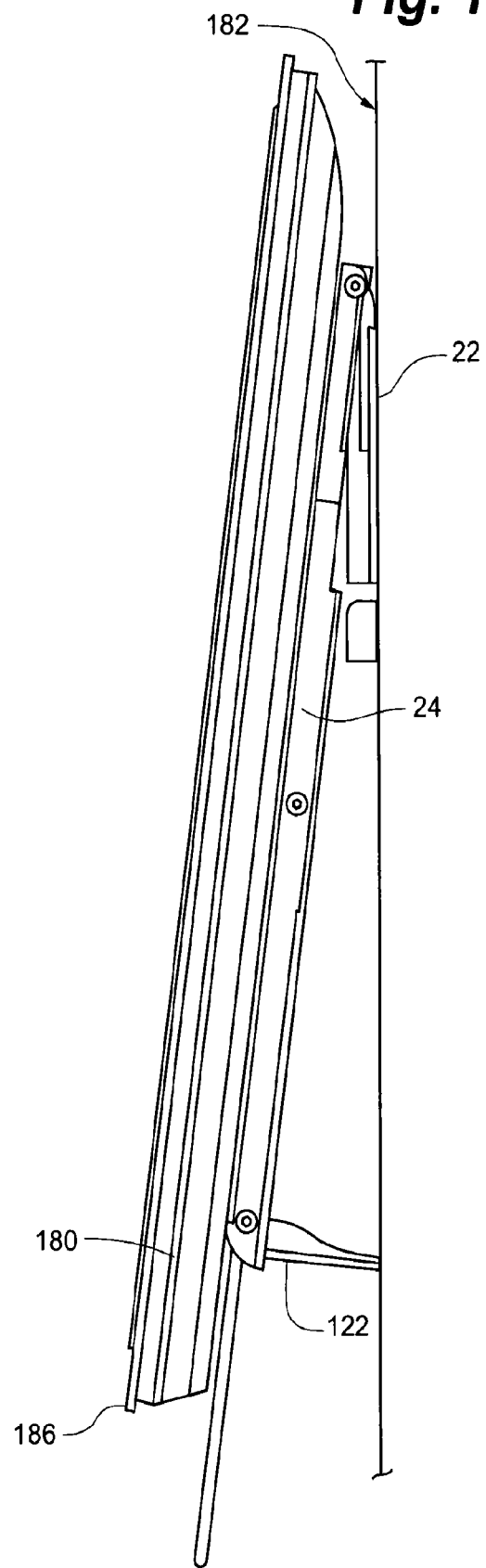
FIG. 14 is a side elevation view of the flat-panel display and mount of FIG. 1 with the mount in a cable access position.
Figure 15:
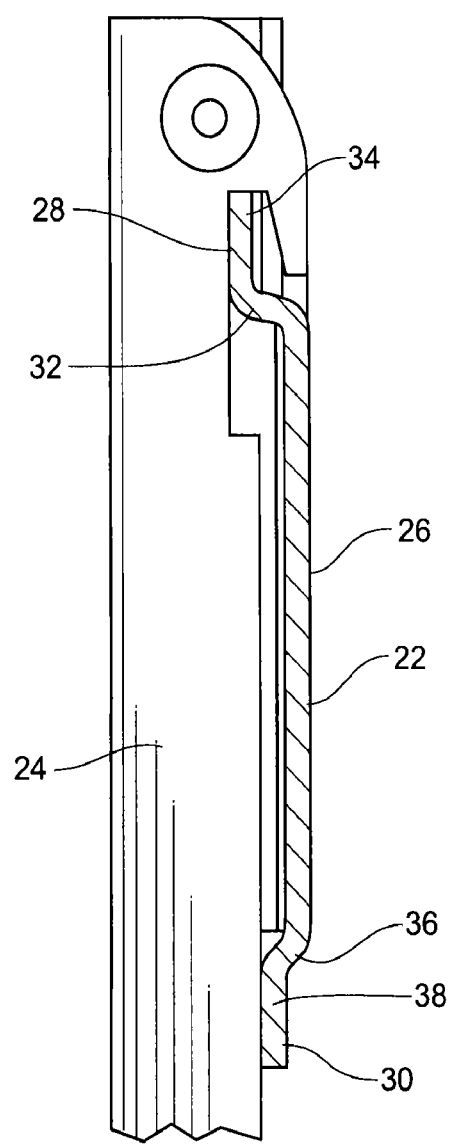
FIG. 15 is a cross-sectional view taken at section 15-15 of FIG. 2.

With tilt assemblies 24 latched to wall interface plate 22, display 180 is securely hung on wall 182. An installer can then simply grasp the lower edge 186 of display 180 and pull outward to deploy kickstands 122. As lower edge 186 is pulled outward, kickstands 122 fold out from hook bracket 40 by gravity and contact wall 182 such that the lower edge 186 of display 180 is held away from wall 182 as depicted in FIG. 14, thereby providing space for connecting wires and cables to display 180 while the display 180 is attached to wall 182. Notably hooks 100, 102, are relieved slightly to enable this pivoting of hook bracket 40 about upper lip 28 without binding. Hook plates 116 of latch assemblies 42 remains snugly engaged behind upper lip 28 to prevent inadvertent disengagement of tilt assemblies 42 from wall interface plate 22.

Figure 12:
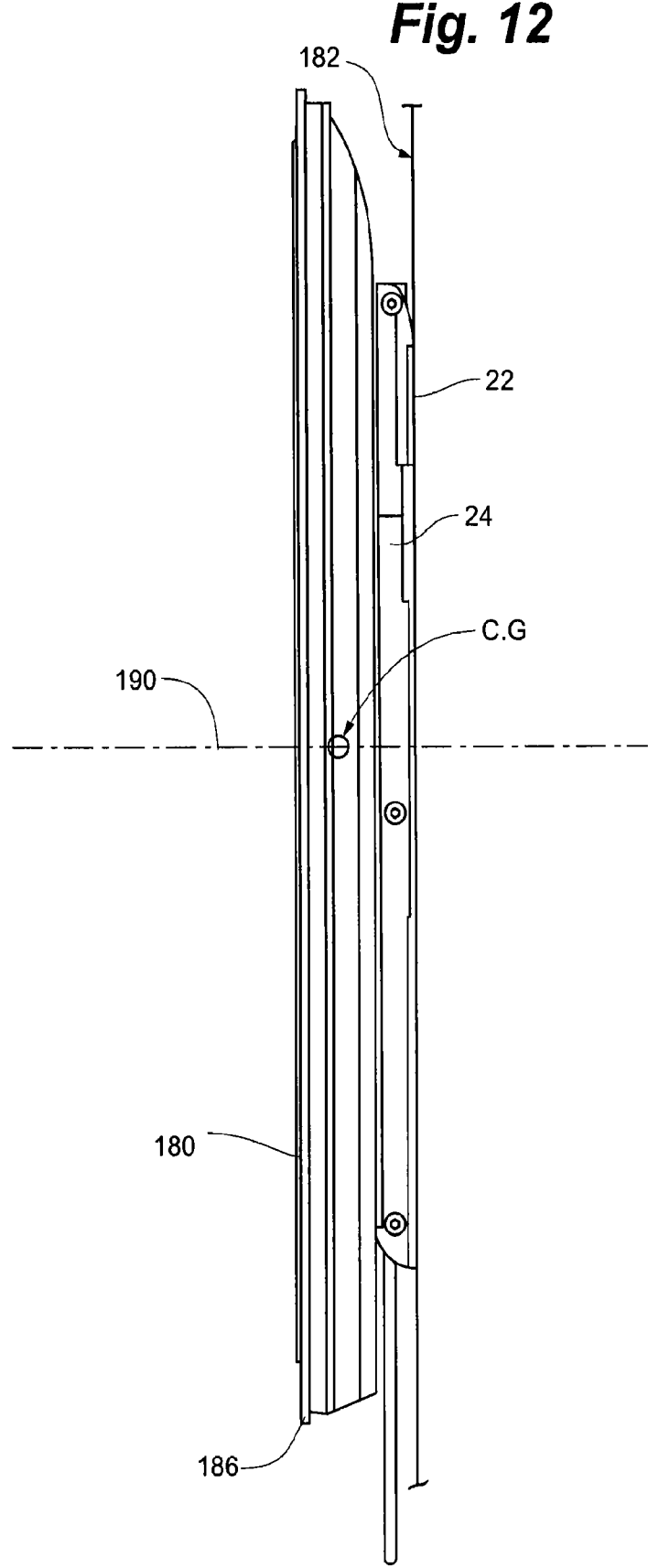
FIG. 12 is a side elevation view of the flat-panel display and mount of FIG. 1 with the mount in a wall-confronting position.

Once the connection of wires and cables is complete, an installer may lift lower edge 186 of display 180 outward slightly, and pull downward on pull handles 126, causing kickstands 122 to pivot upwards adjacent hook brackets 40. Lower edge 186 of display 180 can then be allowed to swing inward adjacent wall 186 so that the mount and display are positioned in a vertical wall-confronting position as depicted in FIG. 12. Removal is the reverse of installation.

Advantageously, tilt assemblies 24 and wall interface plate 22 may be made with a very small total depth dimension, enabling very close mounting of the back side of display 180 to wall 182. In preferred embodiments, the back of display 180 may be as close as 0.25 to 0.50 inch to wall 182 when in the wall confronting position. In some further preferred embodiments, back of display 180 may be about 0.30 inch from wall surface 180 when in the wall confronting position.

The scissors assembly 44 of each tilt assembly 24 functions to enable display 180 to be selectively tilted outward from wall 182 as desired. As upper edge 188 of display 180 is pulled outward away from wall 182, outer arm assembly 50 pivots about fasteners 172, 174, while inner arm assembly pivots on upper pivot axle 90. Rollers 70 ride upward behind inwardly extending flanges 96, 98, of hook bracket 40, while slide blocks 86, 88, are slide upward in track portion 163 of display interface 48 behind flanges 164, 166.

Figure 13:
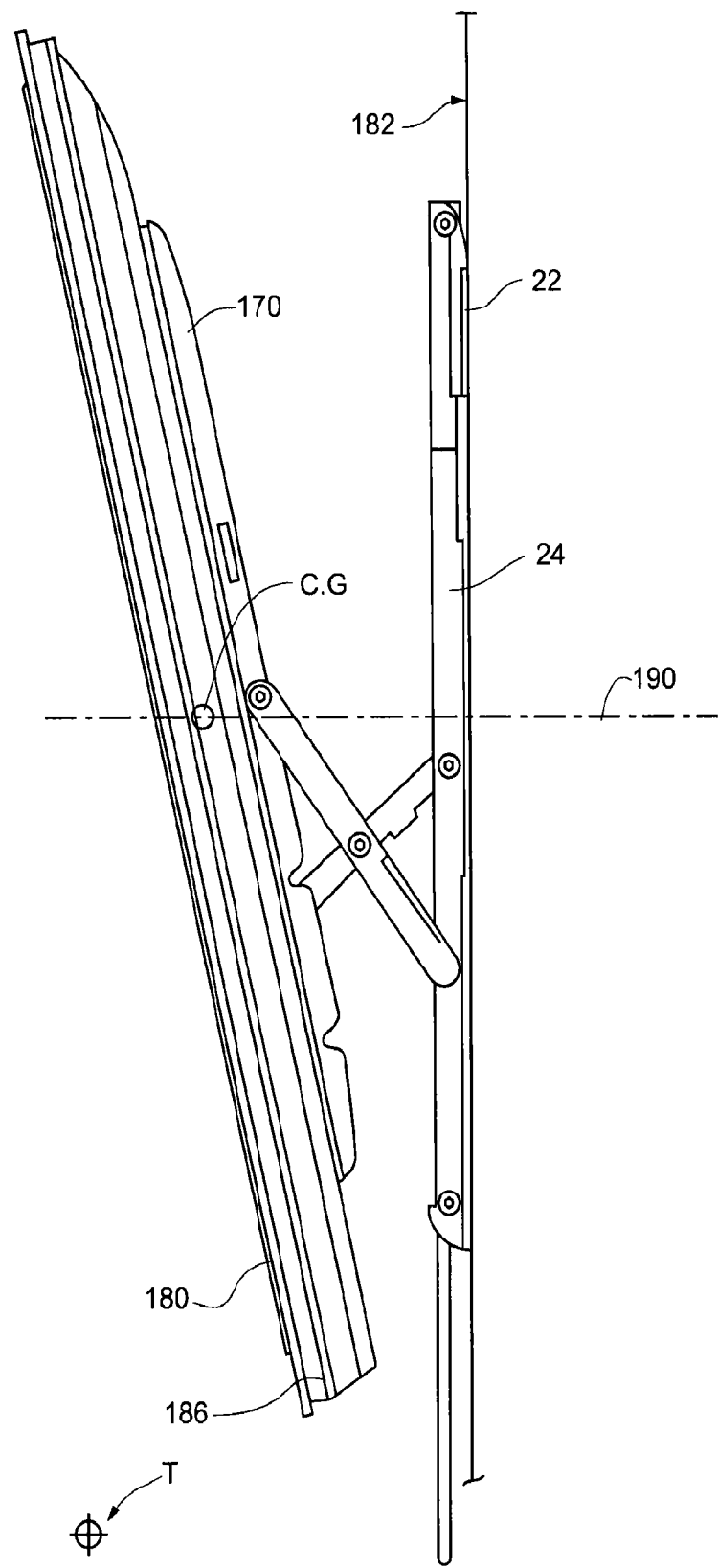
FIG. 13 is a side elevation view of the flat-panel display and mount of FIG. 1 with the mount in a tilted position.

Those of skill will appreciate that the geometry of scissors assemblies 44 may be configured, by adjusting the length of rails 56, 58, 74, 76, and the positions of the pivots and slides, such that the lower edge 186 of display 180 shifts upward and away from wall 182 as the display 180 is tilted about a tilt axis T located forward of and below the display 180, between the more vertical position depicted in FIG. 12 and the tilted position depicted in FIG. 13. Further, a point disposed forwardly from display receiving surface 170, and preferably horizontally registered with a center of gravity C.G. of display 180, may translate substantially horizontally along an axis 190. This enables the display 180 is to self-balance at any position along its travel from the wall confronting position of FIG. 12 and the fully tilted position of FIG. 13, without the need to introduce further friction or retaining mechanisms into tilt assemblies 24. Further details and configurations of wall avoiding self balancing display mounts are disclosed in PCT International Application No. PCT/US2008/000117, assigned to the owners of the present invention and hereby fully incorporated herein by reference.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An electronic display system comprising:
    a flat panel electronic display; and
    a mount for attaching the flat panel electronic display to a substantially vertical wall surface, the mount comprising:
        a wall interface adapted to attach to the wall surface; and
        a pair of tilt assemblies, each tilt assembly including a hook bracket for engaging the wall interface, a display interface presenting a display receiving surface for receiving the flat panel electronic display, and a scissors assembly operably coupling the hook bracket and the display interface, the tilt assemblies being coupled to a rear side of the flat panel electronic display and selectively shiftable between a wall confronting position wherein the rear side of the flat panel electronic display is substantially parallel and proximate to the wall, and a tilt position wherein the top of the flat panel electronic display is tilted away from the wall, wherein the scissors assembly comprises a first arm assembly presenting a first end and an opposing second end, and a second arm assembly presenting a third end and an opposing fourth end, the first end of the first arm assembly being operably coupled to the wall interface, the second end of the first arm assembly being operably coupled to the display interface, the first arm assembly being without any length-extending arm, the third end of the second arm assembly being operably coupled to the wall interface above the coupling of the first end of the first arm assembly to the wall interface, and the fourth end of the second arm assembly being operably coupled to the display interface below the coupling of the second end of the first arm assembly to the display interface, the second arm assembly being without any length-extending arm, the first arm assembly defining a first length dimension extending from the first end to the second end of the first arm assembly, the second arm assembly defining a second length dimension extending from the third end to the fourth end of the second arm assembly, wherein the first arm assembly is pivotally coupled with the second arm assembly at a position between the third end and the fourth end of the second arm assembly, wherein the first length dimension of the first arm assembly is greater than a second length dimension of the second arm assembly, the scissors assembly configured so that a point forward of the display receiving surface and horizontally registered with a center of gravity of the flat panel electronic display translates substantially horizontally continuously along its travel as the tilt assembly is shifted between the wall confronting position and the tilt position.

2. The system of claim 1, wherein the first arm assembly comprises a pair of parallel rails and the second arm assembly comprises a pair of parallel rails.

3. The system of claim 1, wherein the first arm assembly is pivotally coupled to the wall interface and slidably coupled to the display interface, and wherein the second arm assembly is pivotally coupled to the display interface and slidably coupled to the wall interface.

4. The system of claim 1, wherein each tilt assembly further comprises a kickstand assembly, and wherein the flat panel electronic display is selectively shiftable to a third position enabling access to the back side of the flat panel electronic display wherein the top of the flat panel electronic display is proximate the wall surface and the bottom of the flat panel electronic display is spaced apart from the wall surface, the kickstand assembly including a kickstand for contacting the wall surface to maintain the flat panel electronic display in the third position.

5. A mount for attaching a flat panel electronic display to a substantially vertical wall surface, the mount comprising:
    a wall interface adapted to attach to the wall surface; and
    a pair of tilt assemblies, each tilt assembly including a hook bracket for engaging the wall interface, a display interface presenting a display mounting surface adapted to receive the flat panel electronic display thereon, and a scissors assembly operably coupling the hook bracket and the display interface, the tilt assemblies being selectively shiftable between a wall confronting position wherein the rear side of the flat panel electronic display is substantially parallel and proximate to the wall, and a tilt position wherein the top of the flat panel electronic display is tilted away from the wall, wherein the scissors assembly comprises a first arm assembly presenting a first end and an opposing second end, and a second arm assembly presenting a third end and an opposing fourth end, the first end of the first arm assembly being operably coupled to the wall interface, the second end of the first arm assembly being operably coupled to the display interface, the first arm assembly being without any length-extending arm, the third end of the second arm assembly being operably coupled to the wall interface above the coupling of the first end of the first arm assembly to the wall interface, and the fourth end of the second arm assembly being operably coupled to the display interface below the coupling of the second end of the first arm assembly to the display interface, the second arm assembly being without any length-extending arm, the first arm assembly defining a first length dimension extending from the first end to the second end of the first arm assembly, the second arm assembly defining a second length dimension extending from the third end to the fourth end of the second arm assembly, wherein the first arm assembly is pivotally coupled with the second arm assembly at a position between the third end and the fourth end of the second arm assembly, wherein the first length dimension of the first arm assembly is greater than a second length dimension of the second arm assembly, the scissors assembly configured so that a point spaced apart forwardly from the display receiving surface translates substantially horizontally continuously along its travel as the tilt assembly is shifted between the wall confronting position and the tilt position.

6. The mount of claim 5, wherein the first arm assembly comprises a pair of parallel rails and the second arm assembly comprises a pair of parallel rails.

* * * * *